United States Patent
Kaminsky et al.

(10) Patent No.: US 8,412,397 B2
(45) Date of Patent: Apr. 2, 2013

(54) CLUTCH FILL COMMAND BASED ON CLUTCH SLIP SPEED PROFILE SYNCHRONIZATION PREDICTION

(75) Inventors: Lawrence A. Kaminsky, White Lake, MI (US); Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/024,660

(22) Filed: Feb. 10, 2011

(65) Prior Publication Data

US 2012/0209461 A1  Aug. 16, 2012

(51) Int. Cl.
*B60K 6/387* (2007.10)

(52) U.S. Cl. ............................................. 701/22; 701/67
(58) Field of Classification Search ............... 701/22, 701/67, 68

See application file for complete search history.

(56) References Cited

U.S. PATENT DOCUMENTS

| | | | |
|---|---|---|---|
| 6,622,805 B2 * | 9/2003 | Nakashima | 180/65.25 |
| 7,356,398 B2 * | 4/2008 | Steinmetz et al. | 701/55 |
| 7,494,435 B2 * | 2/2009 | Bucknor et al. | 475/5 |
| 2007/0145749 A1 * | 6/2007 | Holmes et al. | 290/45 |
| 2007/0260381 A1 * | 11/2007 | Sah | 701/51 |
| 2007/0276569 A1 * | 11/2007 | Sah et al. | 701/51 |
| 2009/0082171 A1 * | 3/2009 | Conlon et al. | 477/5 |
| 2009/0105039 A1 * | 4/2009 | Sah et al. | 477/5 |
| 2010/0248892 A1 * | 9/2010 | Sah | 477/5 |
| 2010/0298089 A1 * | 11/2010 | Sah | 477/5 |
| 2010/0305791 A1 * | 12/2010 | Sah et al. | 701/22 |

* cited by examiner

*Primary Examiner* — James P Trammell
*Assistant Examiner* — David Testardi
(74) *Attorney, Agent, or Firm* — Quinn Law Group, PLLC

(57) ABSTRACT

A vehicle includes an engine, a first motor, and a second motor, each configured to generate a torque. A gearbox is configured to receive the generated torque. An oncoming clutch is configured to engage during a transition from a present operating mode to a target operating mode. A controller is configured to identify a speed profile associated with a transition to the target operating mode. The speed profile defines a calibrated profile time that represents an amount of time to synchronize the oncoming clutch during the transition from the present operating mode to the target operating mode. The controller is configured to adjust the calibrated profile time in real time to define an adjusted profile time and control the engagement of the oncoming clutch during the transition from the present operating mode to the target operating mode based at least in part on the adjusted profile time.

10 Claims, 2 Drawing Sheets

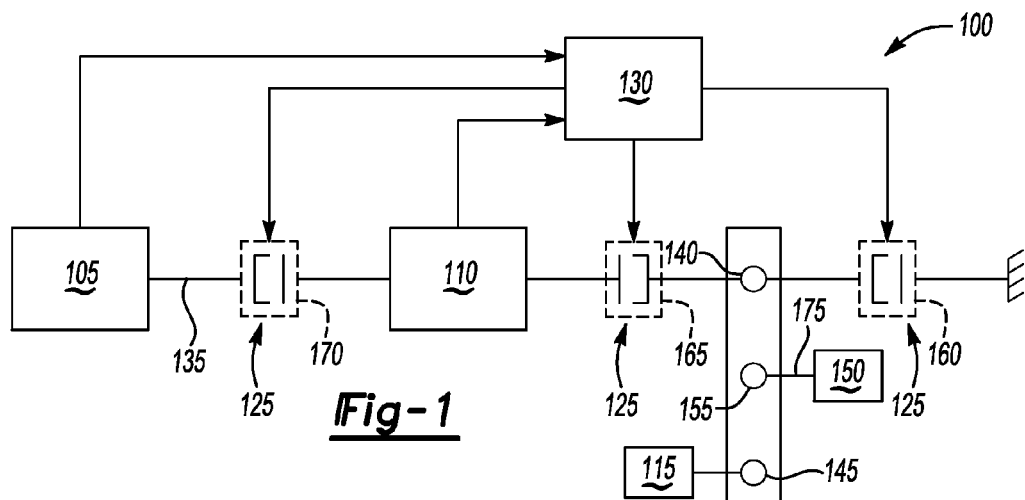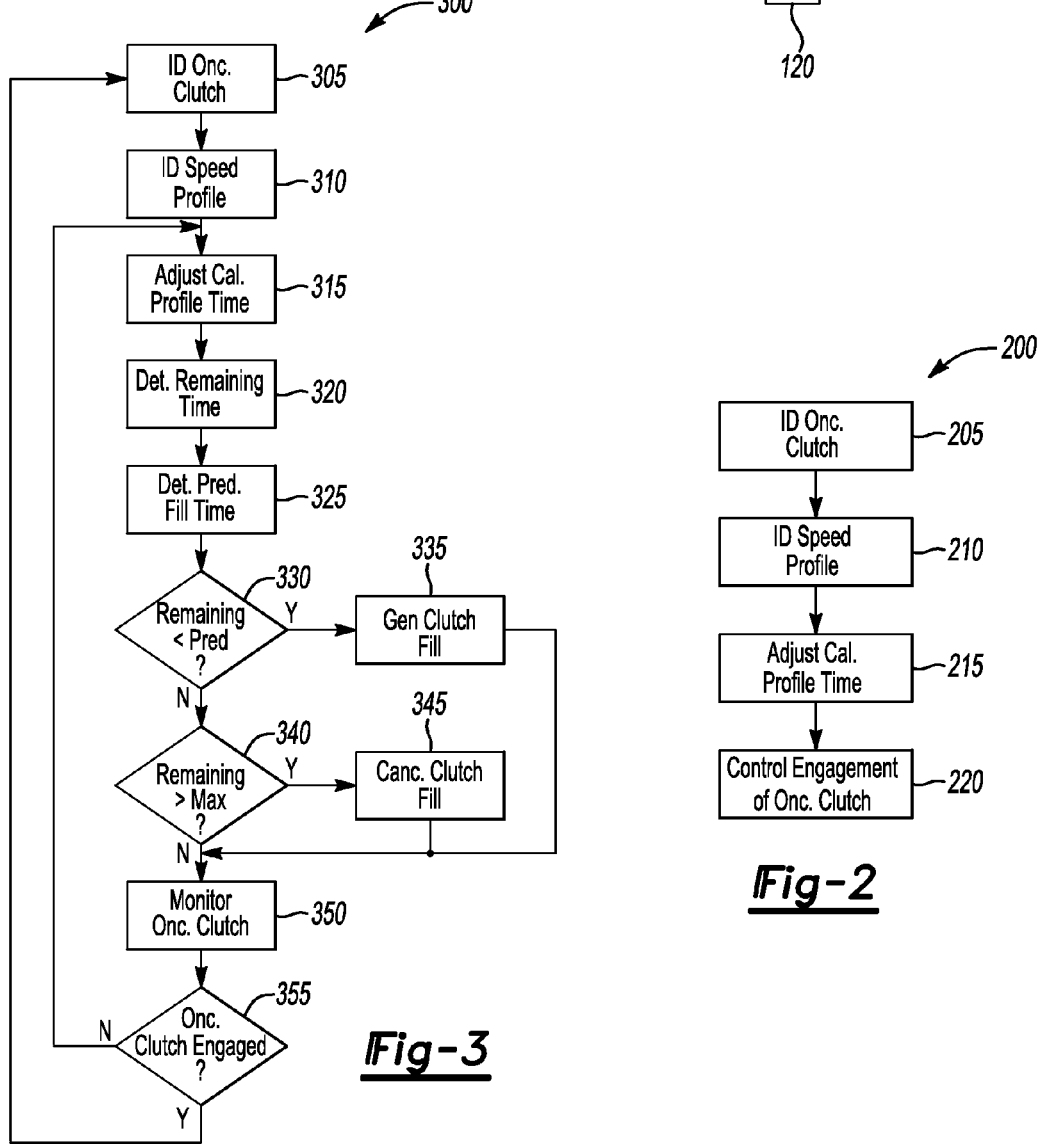

Conference US 8,412,397 B2

CLUTCH FILL COMMAND BASED ON CLUTCH SLIP SPEED PROFILE SYNCHRONIZATION PREDICTION

TECHNICAL FIELD

The disclosure relates to a clutch fill command based on a clutch slip speed profile synchronization prediction.

BACKGROUND

Passenger and commercial vehicles, including hybrid vehicles, use various clutches to transfer torque between two or more vehicle components. In some hybrid vehicles, clutches may be used to transfer torque generated by an engine and/or one or more motors to wheels of the vehicle so that the generated torque may propel the vehicle. Multiple clutches may be used to allow the hybrid vehicle to operate in various operating modes (e.g., engine only, motor only, etc.).

SUMMARY

An example vehicle includes an engine, a first motor, and a second motor, each configured to generate a torque. A gearbox is configured to receive the torque generated by the engine, the first motor, and/or the second motor. An oncoming clutch is configured to engage during a transition from a present operating mode to a target operating mode. A controller is configured to identify a speed profile associated with the transition to the target operating mode. The speed profile defines a calibrated profile time that represents an amount of time to synchronize the oncoming clutch during the transition from the present operating mode to the target operating mode. The controller is configured to adjust the calibrated profile time in real time to define an adjusted profile time and control the engagement of the oncoming clutch during the transition from the present operating mode to the target operating mode based at least in part on the adjusted profile time.

An example method includes identifying an oncoming clutch based on a transition from a present operating mode of a hybrid vehicle to a target operating mode of the hybrid vehicle. The oncoming clutch is configured to engage during the transition to the target operating mode. The method further includes identifying a speed profile associated with the transition to the target operating mode. The speed profile defines a calibrated profile time that represents an amount of time to synchronize the oncoming clutch during the transition from the present operating mode to the target operating mode. The method also includes adjusting the calibrated profile time in real time to define an adjusted profile time via a computing device and controlling the engagement of the oncoming clutch during the transition from the present operating mode to the target operating mode based at least in part on the adjusted profile time.

The features and advantages of the present disclosure are readily apparent from the following detailed description of the best modes for carrying out the invention when taken in connection with the accompanying drawings.

BRIEF DESCRIPTION OF THE DRAWINGS

FIG. 1 is a schematic diagram of an example vehicle having a controller configured to control the engagement of an oncoming clutch.

FIG. 2 is a flowchart of an example process implemented by the controller of FIG. 1 to control the engagement of the oncoming clutch.

FIG. 3 is a flowchart of another example process that may be implemented by the controller of FIG. 1 to control the engagement of the oncoming clutch.

DETAILED DESCRIPTION

Figure 4:
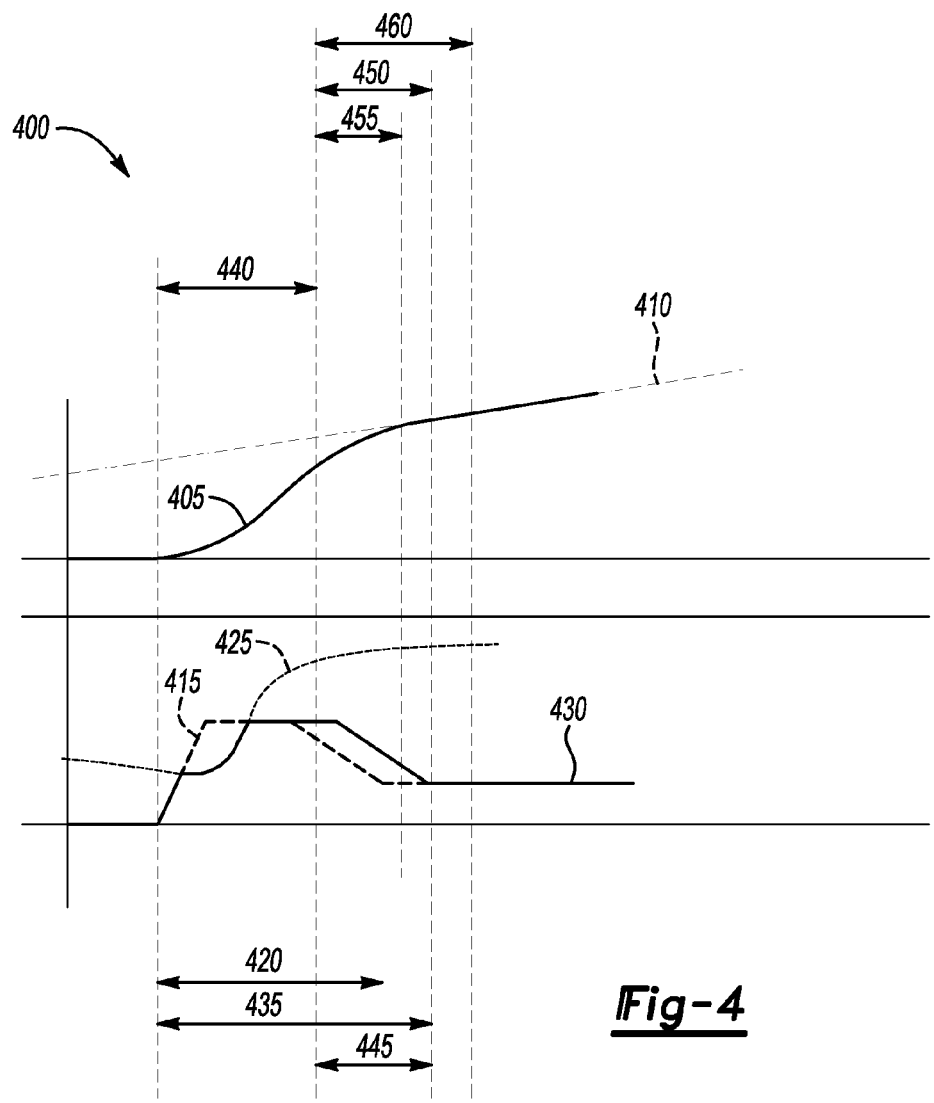
FIG. 4 is a graph of an example speed and acceleration profile of the gearbox during the transition from a present operating mode to a target operating mode.

A vehicle is provided with a controller configured to control the engagement of an oncoming clutch using a speed profile associated with a transition to a target operating mode of the vehicle. The controller may use the speed profile to define a calibrated profile time that represents an amount of time needed to synchronize the oncoming clutch during the transition to the target operating mode. The controller may, in real time, adjust the calibrated profile time to define an adjusted profile time and control the engagement of the oncoming clutch using the adjusted profile time to execute faster or slower transitions to the target operating mode. The vehicle may take many different forms and include multiple and/or alternate components and facilities. While an example vehicle is shown in the Figures, the components illustrated in the Figures are not intended to be limiting. Indeed, additional or alternative components and/or implementations may be used.

FIG. 1 illustrates an example vehicle 100 that includes an engine 105, a first motor 110, a second motor 115, a gearbox 120, one or more clutches 125, and a controller 130. The vehicle 100 may be any passenger or commercial automobile such as a hybrid electric vehicle including a plug-in hybrid electric vehicle (PHEV), an extended range electric vehicle (EREV), or the like.

The engine 105 may include any device configured to generate an engine torque by, e.g., converting a fuel into rotational motion. Accordingly, the engine 105 may be an internal combustion engine configured to convert energy from a fossil fuel into rotational motion using a thermodynamic cycle. The engine 105 may be configured to output the engine torque via a crankshaft 135.

The first motor 110 may include any device configured to generate a first motor torque by, e.g., converting electrical energy into rotational motion. For instance, the first motor 110 may be configured to receive electrical energy from a power source (not shown) such as a battery. The power source may be configured to store and output electrical energy, such as direct current (DC) energy. An inverter (not shown) may be used to convert the DC energy from the battery into alternating current (AC) energy. The first motor 110 may be configured to use the AC energy from the inverter to generate rotational motion. The first motor 110 may be further configured to generate electrical energy when provided with a torque, such as the engine torque. For example, the first motor 110 may generate AC energy that may be converted by the inverter into DC energy and stored in the power source.

The second motor 115 may include any device configured to generate a second motor torque by, e.g., converting electrical energy into rotational motion. Like the first motor 110, the second motor 115 may be configured to receive electrical energy from the power source either directly or via the inverter. The second motor 115 may be further configured to generate electrical energy that may be stored in, e.g., the power source.

The gearbox 120 may include any device configured to convert the engine torque, the first motor torque, and/or the second motor torque into rotational motion (e.g., a propulsion torque) that may be used to propel the vehicle 100. For instance, the gearbox 120 may include one or more planetary gearsets having a plurality of gears of various sizes. The gearbox 120 may be configured to receive the engine torque and/or the first motor torque via a first input node 140, and the second motor torque via a second input node 145. The gearbox 120 may output the propulsion torque to wheels 150 of the vehicle 100 via an output shaft 175 connected to an output node 155.

Each clutch 125 may include any device configured to engage to transfer torque generated by one component of the vehicle 100 to another. For instance, each clutch 125 may include a driving mechanism and a driven mechanism. The driving mechanism may be configured to rotate when provided with, e.g., the engine torque, the first motor torque, the second motor torque, etc. When fully engaged, the driven mechanism may rotate at the same speed as the driving mechanism. When disengaged or partially engaged, however, the driven mechanism is free to slip relative to the driving mechanism, allowing the driving mechanism and the driven mechanism to rotate at different speeds.

While the vehicle 100 may include any number of clutches 125, a first clutch 160, a second clutch 165, and a third clutch 170 are illustrated in FIG. 1. The first clutch 160 may be grounded (e.g., the driven mechanism is fixed and does not rotate) operably connected to the first input node 140 of the gearbox 120. When the first clutch 160 is engaged, the first clutch 160 may prevent one or more gears in the gearbox 120 from rotating so that the second motor torque may be transferred from the second input node 145 to the output node 155 to propel the vehicle 100. The second clutch 165 may be operably disposed between the first motor 110 and the first input node 140. When the second clutch 165 is engaged, the first motor torque may be transferred from the first motor 110 to the first input node 140 so that the vehicle 100 may be propelled, at least in part, by the first motor torque (e.g., the first motor torque contributes to the propulsion torque). The third clutch 170 may be operably disposed between the engine 105 and the first motor 110. When the third clutch 170 is engaged, the engine torque may be transferred to the first motor 110 so that the first motor 110 may act as a generator if the second clutch 165 is disengaged or so that the engine torque alone or in combination with the first motor torque may be transferred to the first input node 140 of the gearbox 120 if the second clutch 165 is engaged.

The vehicle 100 may operate in various modes based on, for example, the engagement of one or more of the first clutch 160, the second clutch 165, and the third clutch 170. That is, the first clutch 160 may be engaged during a first operating mode and a second operating mode. The second clutch 165 may be engaged during the second operating mode and a third operating mode. The third clutch 170 may be engaged during the fourth operating mode. As such, the second clutch 165 may engage during the transition from the first operating mode to the second operating mode, and the third clutch 170 may engage during the transition from the third operating mode to the fourth operating mode. The first clutch 160 may engage during a transition to the first operating mode.

Each clutch 125 may be hydraulically operated. That is, each clutch 125 may be configured to engage when provided with fluid at a minimum pressure and disengage when provided with fluid below the minimum pressure. Furthermore, each clutch 125 may be synchronized (i.e., slip is controlled to zero) before the driving mechanism and the driven mechanism are engaged to, for instance, reduce the risk of damaging the clutch 125. That is, synchronously engaging the clutch 125 may avoid the potential for driveline disturbances and heat build-up that may damage the clutch 125. In one possible approach, the engine 105, the first motor 110, or the second motor 115 may be configured to increase or decrease the speed of the driven mechanism of one or more of the clutches 125 to substantially match the speed of the driving mechanism of that same clutch 125. When the speeds of the driving mechanism and the driven mechanism are substantially the same, the slip speed of the clutch 125 is substantially zero so the clutch 125 may be engaged without a significant risk of damage to the clutch 125 caused by, e.g., heat build-up if the clutch 125 is asynchronously engaged. By way of example, the third clutch 170, as illustrated, is operably disposed between the engine 105 and the first motor 110. The engine 105 may be configured to rotate the driving mechanism so that the engine torque is transferred to the first motor 110 when the third clutch 170 is engaged. The first motor 110, therefore, may be configured to increase or decrease the speed of the driven mechanism of the third clutch 170 to substantially match the speed of the driving mechanism prior to the engagement of the third clutch 170.

The controller 130 may include any device configured to identify a transition between operating modes of the vehicle 100 and control the engagement of one or more of the clutches 125 during the transition. In one possible approach, the controller 130 may be configured to identify one of the operating modes (e.g., the first or third operating modes, described above) as a present operating mode and another of the operating modes (e.g., the second or fourth operating modes, described above) as a target operating mode. The controller 130 may further be configured to identify one of the clutches 125 as an oncoming clutch 125 based on, e.g., the clutch 125 that engages during the transition to the target operating mode.

By way of example, if the vehicle 100 is operating in the first operating mode, the controller 130 may be configured to identify the first operating mode as the present operating mode and the second operating mode as the target operating mode. Since the second clutch 165 is engaged during the transition from the first operating mode to the second operating mode, the controller 130 may be further configured to identify the second clutch 165 as the oncoming clutch 125. Similarly, if the vehicle 100 is operating in the third operating mode, the controller 130 may identify the third operating mode as the present operating mode and the fourth operating mode as the target operating mode. Thus, the controller 130 may identify the third clutch 170 as the oncoming clutch 125 since the third clutch 170 engages during the transition from the third operating mode to the fourth operating mode.

Once the present operating mode, the target operating mode, and the oncoming clutch 125 have been identified, the controller 130 may be configured to identify a speed profile associated with the transition to the target operating mode. The speed profile may define a calibrated profile time that represents an amount of time needed to synchronize the oncoming clutch 125 during the transition from the present operating mode to the target operating mode under calibration circumstances. The calibrated profile time may be based on calibration data and stored in a look-up table, database, data repository, or other type of data store (not shown). Various factors, however, may cause the synchronization time of the oncoming clutch 125 to change (e.g., increase or decrease). To compensate for such factors, the controller 130 may be further configured to adjust the calibrated profile time in real time during the transition to define an adjusted profile time. The controller 130 may be configured to control the engagement of the oncoming clutch 125 using the adjusted profile time instead of the calibrated profile time to, e.g., execute faster transitions to the target operating mode without the risk of damaging the oncoming clutch 125 caused by engaging the oncoming clutch 125 too early.

To control the engagement of the oncoming clutch 125, in one possible implementation, the controller 130 may be configured to determine an amount of remaining time until the transition to the target operating mode is complete. For instance, the controller 130 may be configured to measure an amount of time that has elapsed (e.g., the elapsed time) since the beginning of the transition. The controller 130 may be configured to determine the remaining time based, at least in part, on a difference between the elapsed time and the adjusted profile time.

Further, the controller 130 may be configured to determine a predicted fill time, which may be defined by an amount of time needed to fill and engage the oncoming clutch 125. As discussed above, the driving mechanism and the driven mechanism of the oncoming clutch 125 may be synchronized before being engaged to reduce the risk of damage to the oncoming clutch 125. Further, one or more of the clutches 125 may be hydraulically actuated. As such, the controller 130 may be configured to generate a clutch fill command that commands, e.g., a pump or valve body (not shown) to provide fluid to the oncoming clutch 125 so that the oncoming clutch 125 may hydraulically engage. Therefore, the controller 130 may be configured to determine the predicted fill time based on the amount of time needed for the pump or valve body to execute the clutch fill command (e.g., provide enough fluid to the oncoming clutch 125 for the oncoming clutch 125 to engage).

To reduce the risk of damaging the oncoming clutch 125 that may be caused by engaging the oncoming clutch 125 too early, the controller 130 may be configured to generate the clutch fill command if the remaining time is less than the predicted fill time. Since the remaining time may change as the adjusted profile time changes, the controller 130 may be further configured to cancel the clutch fill command at any time, such as when the remaining time is greater than the predicted fill time based on the most-recently determined adjusted profile time.

To prevent the controller 130 from constantly generating and cancelling the clutch fill command, the controller 130 may apply a hysteresis band to the predicted fill time. That is, the controller 130 may recognize the predicted fill time as including a range of times defined by a maximum fill time and a minimum fill time. The controller 130 may be configured to generate the clutch fill command to engage the oncoming clutch 125 if the remaining time is less than the minimum fill time and cancel the clutch fill command if the remaining time is greater than the maximum fill time. The maximum and minimum fill times may be based on, e.g., calibration offset values applied to the predicted fill time. The calibration offset values may be stored in a look-up table, database, data repository, or other type of data store (not shown).

In general, computing systems and/or devices, such as the controller 130, etc., may employ any of a number of computer operating systems and may include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

FIG. 2 illustrates an example process 200 that may be implemented by the controller 130 to, e.g., control the engagement of the oncoming clutch 125 to execute faster transitions from the present operating mode to the target operating mode of the vehicle 100.

At block 205, the controller 130 may identify the oncoming clutch 125 based on a transition from the present operating mode to the target operating mode. The present operating mode may be the mode that the vehicle 100 operates at the beginning of the process 200. The target operating mode may include any mode of operation that the vehicle 100 may transition to from the present operating mode and that requires a clutch 125 to become engaged. The controller 130 may identify the transition from the present operating mode to the target operating mode using various characteristics of the components of the vehicle 100, such as the commanded engine torque, the commanded first motor torque, the commanded second motor torque, a selected gear, a current vehicle speed, etc. The controller 130 may identify, e.g., the first operating mode or the third operating mode described above as the present operating mode and, e.g., the second operating mode or the fourth operating mode as previously described as the target operating mode. Moreover, the controller 130 may use the identified present operating mode and the identified target operating mode to identify the first clutch 160, the second clutch 165, or the third clutch 170 as the oncoming clutch 125. By way of example, the controller 130 may identify the clutch 125 that engages during the second operating mode (e.g., the second clutch 165) or the clutch 125 that engages during the fourth operating mode (e.g., the third clutch 170) as the oncoming clutch 125.

At block 210, the controller 130 may identify the speed profile associated with the transition to the target operating mode. The speed profile may define the calibrated profile time that represents the amount of time to synchronize the oncoming clutch 125 during the transition from the present operating mode to the target operating mode based on calibration data. The speed profile and the calibrated profile time may be stored in one or more look-up tables, databases, data repositories, or any other type of data stores.

At block 215, the controller 130 may adjust the calibrated profile time in real time during the transition from the present operating mode to the target operating mode to define an adjusted profile time. Various factors may cause the calibrated profile time to change. The adjusted profile time accounts for such factors to more accurately represent the actual amount of time needed to synchronize the oncoming clutch 125 during the transition from the present operating mode to the target operating mode.

At block 220, the controller 130 may control the engagement of the oncoming clutch 125 during the transition from the present operating mode to the target operating mode based at least in part on the adjusted profile time. Since the adjusted profile time accounts for factors that may increase the amount of time needed to, e.g., synchronize the oncoming clutch 125, the controller 130 may use the adjusted profile time to more accurately control the engagement of the clutch 125 to, e.g., execute faster transitions from the present operating mode to the target operating mode.

FIG. 3 illustrates another example process 300 that may be used by the controller 130 to control the engagement of the oncoming clutch 125 to, e.g., execute faster transitions from the present operating mode to the target operating mode.

At block 305, the controller 130 may identify the oncoming clutch 125 based on the transition from the present operating mode to the target operating mode. For instance, as previously discussed, the controller 130 may identify the first or third operating modes as the present operating mode and the second or fourth operating mode as the target operating modes. The controller 130 may further identify the oncoming clutch 125 based on the target operating mode.

At block 310, the controller 130 may identify the speed profile associated with the transition to the target operating mode to define the calibrated profile time that represents the amount of time to synchronize the oncoming clutch 125 during the transition from the present operating mode to the target operating mode based on calibration data.

At block 315, the controller 130 may adjust the calibrated profile time in real time during the transition from the present operating mode to the target operating mode to define the adjusted profile time, which, as discussed above, may account for such factors that may extend the amount of time needed to synchronize the oncoming clutch 125. Therefore, the controller 130 may use the adjusted profile time to more accurately represent the actual amount of time needed to synchronize the oncoming clutch 125 during the transition from the present operating mode to the target operating mode.

At block 320, the controller 130 may determine an amount of remaining time to complete the transition to the target operating mode. For instance, the controller 130 may count an amount of time that has elapsed (e.g., the elapsed time) since the beginning of the transition to the target operating mode. The controller 130 may define the remaining time as the difference between the elapsed time and the adjusted profile time.

At block 325, the controller 130 may determine the predicted fill time, which may be defined as the amount of time needed to engage the oncoming clutch 125. The oncoming clutch 125, as described above, may be hydraulically engaged. Therefore, the predicted fill time may include the amount of time for the pump or valve body to execute the clutch fill command (e.g., provide enough fluid to the oncoming clutch 125 to engage). Furthermore, the predicted fill time may include a range of times defined by a maximum fill time and a minimum fill time. The maximum and minimum fill times may be based on, e.g., calibration offset values applied to the predicted fill time. The calibration offset values may be stored in one or more look-up tables, databases, data repositories, or other types of data stores.

At decision block 330, the controller 130 may compare the remaining time to the predicted fill time, or alternatively the minimum fill time, to control the engagement of the clutch 125 in accordance with the adjusted profile time. If the remaining time is less than the predicted fill time or the minimum fill time the process 300 may continue at block 335. If the remaining time is not less than the predicted fill time or the minimum fill time the process 300 may continue at block 340.

At block 335, the controller 130 may generate the clutch fill command in accordance with the adjusted profile time. That is, the controller 130 may generate the clutch fill command at a time when the remaining time is less than the predicted fill time or the minimum fill time, meaning that the oncoming clutch 125 will engage immediately after synchronization, resulting in a faster transition to the target operating mode than if the controller 130 generated the clutch fill command in accordance with the calibrated profile time. The controller 130 may output the clutch fill command to a pump or valve body (not shown) so that the pump or valve body may provide, e.g., the fluid necessary to engage the oncoming clutch 125.

At decision block 340, the controller 130 may compare the remaining time to the predicted fill time, or alternatively the maximum fill time, to further control the engagement of the clutch 125 in accordance with the adjusted profile time. If the remaining time is greater than the predicted fill time or the maximum fill time, the process 300 may continue at block 345. If the remaining time is less than the predicted fill time or the maximum fill time, the process 300 may continue at block 350.

At block 345, the controller 130 may cancel the clutch fill command since engaging the oncoming clutch 125 when the remaining time is greater than the predicted fill time or the maximum fill time may cause the oncoming clutch 125 to engage before the driving mechanism is synchronized with the driven mechanism. Since the adjusted profile time is determined in real time and since the elapsed time is constantly changing, the remaining time may change during each iteration of the process 300. Therefore, the controller 130 may account for instances where the clutch fill command may be appropriately generated for one iteration of the process 300 but not appropriate for the next iteration of the process 300 by canceling a previously generated clutch fill command, thus reducing the risk of engaging the oncoming clutch 125 prematurely as circumstances of the vehicle 100 change.

At block 350, the controller 130 may monitor the oncoming clutch 125 to determine whether the oncoming clutch 125 is engaged. That is, the controller 130 may monitor various factors such as the amount of fluid provided from the pump or valve body to the oncoming clutch 125, the relative speed between the driving and driven mechanisms, etc.

At block 355, the controller 130 may determine whether the oncoming clutch 125 is engaged (e.g., the clutch fill is complete) based on the factors monitored at block 350. If the oncoming clutch 125 is determined to be engaged, the process 300 may continue at block 305 to wait for another transition to a target operating mode that requires a clutch 125 (e.g., a subsequent oncoming clutch 125) to become engaged. If the oncoming clutch 125 has not yet engaged, the process 300 may return to block 315 so that the calibrated profile time or the previously determined adjusted profile time may be adjusted if necessary. The process 300 may continue after block 315 so that the oncoming clutch 125 may be controlled in accordance with the most recently determined adjusted profile time.

FIG. 4 illustrates a graph 400 of an example speed and acceleration profile of the gearbox 120 during the transition from the present operating mode to the target operating mode. The line 405 indicates an example input speed of the gearbox 120 during the transition from the present operating mode to the target operating mode. The dashed line 410 represents the product of the output speed and selected gear ratio designated by the target operating mode. During the transition to the target operating mode, the input speed 405 of the gearbox 120 may be increased (as illustrated) or decreased until the slope of the input speed 405 is substantially equivalent to a slope of the product of the output speed and gear ratio 410 designated by the target operating mode.

The dashed line 415 represents an example desired input acceleration of the gearbox 120 during the transition from the present operating mode to the next operating mode. The calibrated profile time 420 may indicate the amount of time desired to engage (e.g., synchronize and fill) the oncoming clutch 125 based on the desired acceleration profile 415. As illustrated, the calibrated profile time 420 may start at the beginning of the transition (e.g., at the time the input speed 405 begins to increase) and end when the slope of the input speed 405 is substantially equal to the slope of the output speed multiplied by the gear ratio 410.

According to the desired input acceleration 415, the acceleration of the input speed 405 should increase initially before becoming substantially level. However, in the example graph 400 of FIG. 4, an acceleration constraint 425 may prevent the input speed 405 from increasing as the desired input acceleration 415 may suggest. Instead of the desired input acceleration 415, the speed of the gearbox 120 may be controlled via an adjusted input acceleration 430 that requires more time to execute the transition than if the input speed 405 were controlled using the desired input acceleration 415. Accordingly, the controller 130 may control the engagement of the oncoming clutch 125 using the adjusted profile time 435, which compensates for the acceleration constraint 425.

In one possible approach, the controller 130 may determine the amount of time that has elapsed (e.g., the elapsed time 440) since the beginning of the adjusted profile time 435, and determine the remaining time 445 before the oncoming clutch 125 may engage using the adjusted profile time 435 and the elapsed time 440. The predicted fill time 450 may be based on the time needed by the pump or valve body to provide a sufficient amount of fluid to the clutch 125 for the clutch 125 to engage. The controller 130 may compare the remaining time 445 to the predicted fill time 450 to generate the clutch fill command. That is, the controller 130 may generate the clutch fill command if the remaining time 445 is less than the predicted fill time 450 and cancel the clutch fill command if the remaining time 445 is greater than the predicted fill time 450.

Alternatively, the predicted fill time 450 may be represented by a hysteresis band defined by a maximum fill time 460 and a minimum fill time 455. The controller 130 may compare the remaining time 445 to the minimum fill time 455 and generate the clutch fill command if the remaining time 445 is less than the minimum fill time 455. The controller 130 may further compare the remaining time 445 to the maximum fill time 460 and cancel the clutch fill command if the remaining time 445 is greater than the maximum fill time 460.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an engine configured to generate an engine torque;
a first motor configured to generate a first motor torque;
a second motor configured to generate a second motor torque;
a gearbox configured to receive at least one of the engine torque, the first motor torque, and the second motor torque;
an oncoming clutch operably connected to at least one of the engine, the first motor, the second motor, and the gearbox and configured to engage during a transition from a present operating mode to a target operating mode; and
a controller configured to:
determine a predicted fill time of the oncoming clutch, wherein the predicted fill time is a predicted amount of time for filling the oncoming clutch with a sufficient amount of fluid for engaging the oncoming clutch;
identify a speed profile associated with the transition to the target operating mode, wherein the speed profile defines a calibrated profile time that represents a calibrated amount of time to synchronize the oncoming clutch during the transition from the present operating mode to the target operating mode;
adjust the calibrated profile time in real time to define an adjusted profile time;
calculate a remaining time to complete the transition to the target operating mode as the difference between an elapsed time since the beginning of the transition and the adjusted profile time;
compare the remaining time to the predicted fill time; and
control the engagement of the oncoming clutch during the transition from the present operating mode to the target operating mode by cancelling the clutch fill command when the remaining time exceeds the predicted fill time and by completing the clutch fill when the remaining time is less than the predicted fill time.

2. A vehicle as set forth in claim 1, wherein the controller is configured to generate a clutch fill command in accordance with the adjusted profile time to engage the oncoming clutch.

3. A vehicle as set forth in claim 1, wherein the controller is configured to identify the transition from the present operating mode to the target operating mode.

4. A vehicle as set forth in claim 1, wherein the controller is configured to calculate the remaining time to complete the transition to the target operating mode based at least in part on a difference between an elapsed time and the adjusted profile time.

5. A vehicle as set forth in claim 4, wherein the controller is configured to determine a predicted fill time defined as an amount of time to engage the oncoming clutch.

6. A vehicle as set forth in claim 5, wherein the predicted fill time includes a range of times defined by a maximum fill time and a minimum fill time, and wherein the controller is configured to generate a clutch fill command if the remaining time is less than the minimum fill time and cancel the clutch fill command if the remaining time is greater than the maximum fill time.

7. A method comprising:
- identifying an oncoming clutch based on a transition from a present operating mode of a hybrid vehicle to a target operating mode of the hybrid vehicle, wherein the oncoming clutch is configured to engage during the transition to the target operating mode;
- determining a predicted fill time of the oncoming clutch, wherein the predicted fill time is a predicted amount of time for filling the oncoming clutch with a sufficient amount of fluid for engaging the oncoming clutch;
- identifying a speed profile associated with the transition to the target operating mode, wherein the speed profile defines a calibrated profile time that represents a calibrated amount of time to synchronize the oncoming clutch during the transition from the present operating mode to the target operating mode;
- adjusting the calibrated profile time in real time to define an adjusted profile time via a computing device;
- calculating a remaining time to complete the transition to the target operating mode as the difference between an elapsed time since the beginning of the transition and the adjusted profile time;
- comparing the remaining time to the predicted fill time; and
- controlling the engagement of the oncoming clutch during the transition from the present operating mode to the target operating mode by cancelling the clutch fill command when the remaining time exceeds the predicted fill time and completing the clutch fill when the remaining time is less than the predicted fill time.

8. A method as set forth in claim 7, wherein controlling the engagement of the oncoming clutch includes generating a clutch fill command in accordance with the adjusted profile time to engage the oncoming clutch.

9. A method as set forth in claim 7, wherein controlling the engagement of the oncoming clutch includes determining, via the computing device, the predicted fill time defined as an amount of time to engage the oncoming clutch.

10. A method as set forth in claim 9, wherein the predicted fill time includes a range of times defined by a maximum fill time and a minimum fill time, and wherein controlling the engagement of the oncoming clutch includes:
- generating a clutch fill command if the remaining time is less than the minimum fill time; and
- cancelling the clutch fill command if the remaining time is greater than the maximum fill time.

* * * * *